United States Patent
Liang

(10) Patent No.: US 7,308,554 B2
(45) Date of Patent: *Dec. 11, 2007

(54) PROCESSOR-BASED AUTOMATIC ALIGNMENT DEVICE AND METHOD FOR DATA MOVEMENT

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 418 days.

This patent is subject to a terminal disclaimer.

(21) Appl. No.: 10/987,164

(22) Filed: Nov. 15, 2004

(65) Prior Publication Data

US 2005/0138342 A1 Jun. 23, 2005

(30) Foreign Application Priority Data

Dec. 19, 2003 (TW) .............................. 92136296 A

(51) Int. Cl.
*G06F 12/04* (2006.01)
(52) U.S. Cl. ...................................... 711/214; 711/154
(58) Field of Classification Search ................ 711/117, 711/154, 201, 214; 710/22; 708/209
See application file for complete search history.

(56) References Cited

U.S. PATENT DOCUMENTS

| 4,814,976 A | * | 3/1989 | Hansen et al. ............... 711/201 |
| 5,168,561 A | * | 12/1992 | Vo ............................... 710/22 |
| 5,295,250 A | * | 3/1994 | Komoto et al. ............. 708/209 |
| 5,386,531 A | * | 1/1995 | Blaner et al. ................ 711/201 |
| 5,740,398 A | * | 4/1998 | Quattromani et al. ....... 711/117 |
| 6,721,866 B2 | * | 4/2004 | Roussel et al. ............. 711/201 |
| 7,051,168 B2 | * | 5/2006 | Gschwind et al. .......... 711/154 |
| 2006/0010304 A1 | * | 1/2006 | Homewood et al. ........ 711/201 |

* cited by examiner

*Primary Examiner*—Matthew Kim
*Assistant Examiner*—Paul Schlie
(74) *Attorney, Agent, or Firm*—Bacon & Thomas, PLLC

(57) ABSTRACT

A processor-based automatic alignment device and method for data movement. Data stored in a memory at a first position is partitioned by word boundaries into a first part, a second part and a third part and written to the memory at a second position. The device includes: an internal register, a load combine register, a shifter, a rotator, a store combine register and a mask selector. Data is loaded in and aligned by the device for storing in internal register of a processor. Then, data stored in the internal register is automatically aligned and then written in the memory at an unaligned position.

24 Claims, 24 Drawing Sheets

LWL   rA, (100+x)h
LWR   rA, (100+x+3)h
SWL   rA, (200+y)h
SWR   rA, (200+y+3)h
LWL   rA, (104+x)h
LWR   rA, (104+x+3)h
SWL   rA, (204+y)h
SWR   rA, (204+y+3)h
LWL   rA, (108+x)h
LWR   rA, (108+x+3)h
SWL   rA, (208+y)h
SWR   rA, (208+y+3)h

FIG. 1

| Format | Meanning |
|---|---|
| LCB [Addr] | Load Combine Begin |
| LCW rD, [Addr] | Load Combine Word |
| LCE rD, [Addr] | Load Combine End |
| SCB rD, [Addr] | Store Combine Begin |
| SCW rD, [Addr] | Store Combine Word |
| SCE [Addr] | Store Combine End |

FIG. 7

LDCR

LCB [101h] | Z | A | B | C |    100h | Z | A | B | C |

FIG. 8

LDCR | a | b | c | d |          100h | A | B | C | D |

|     | Big Endian |           |            | Little Endian |           |            |
|     | Mode (Big) | rD        | Next LDCR  | Load Word? | Mode (Little) | rD | Next LDCR | Load Word? |
|-----|------------|-----------|------------|------------|---------------|-----|-----------|------------|
| LCB | s=0 | (Not Set) | ABCD | YES | s=0 | (Not Set) | ABCD | YES |
|     | s=1 | (Not Set) | ABCD | YES | s=1 | (Not Set) | ABCD | YES |
|     | s=2 | (Not Set) | ABCD | YES | s=2 | (Not Set) | ABCD | YES |
|     | s=3 | (Not Set) | ABCD | YES | s=3 | (Not Set) | ABCD | YES |
| LCW | s=0 | abcd | ABCD | YES | s=0 | dABC | ABCD | YES |
|     | s=1 | bcdA | ABCD | YES | s=1 | cdAB | ABCD | YES |
|     | s=2 | cdAB | ABCD | YES | s=2 | bcdA | ABCD | YES |
|     | s=3 | dABC | ABCD | YES | s=3 | abcd | ABCD | YES |
| LCE | s=0 | abcd | (Not Set) | NO  | s=0 | dABC | ABCD | YES |
|     | s=1 | bcdA | ABCD | YES | s=1 | cdAB | ABCD | YES |
|     | s=2 | cdAB | ABCD | YES | s=2 | bcdA | ABCD | YES |
|     | s=3 | dABC | ABCD | YES | s=3 | abcd | (Not Set) | NO |

FIG. 11

STCR [a|b|c|d]    rD [A|B|C|D]    100h [X|Y|Z|W]

|  |  | Big Endian | | | Little Endian | | |
|---|---|---|---|---|---|---|---|
|  | Mode (Big) | MEM | Next STCR | Store Word? | Mode (Little) | MEM | Next STCR | Store Word? |
| SCB | s=0 | ABCD | ABCD | YES | s=0 | XYZA | BCDA | YES(mask) |
|  | s=1 | XABC | DABC | YES(Mask) | s=1 | XYAB | CDAB | YES(mask) |
|  | s=2 | XYAB | CDAB | YES(Mask) | s=2 | XABC | DABC | YES(mask) |
|  | s=3 | XYZA | BCDA | YES(Mask) | s=3 | ABCD | ABCD | YES(mask) |
| SCW | s=0 | ABCD | ABCD | YES | s=0 | abcA | BCDA | YES |
|  | s=1 | aABC | DABC | YES | s=1 | abAB | CDAB | YES |
|  | s=2 | abAB | CDAB | YES | s=2 | aABC | DABC | YES |
|  | s=3 | abcA | BCDA | YES | s=3 | ABCD | ABCD | YES |
| SCE | s=0 | (not write) | (not set) | NO | s=0 | abcW | (not set) | YES(Mask) |
|  | s=1 | aYZW | (not set) | YES(Mask) | s=1 | abZW | (not set) | YES(Mask) |
|  | s=2 | abZW | (not set) | YES(Mask) | s=2 | aYZW | (not set) | YES(Mask) |
|  | s=3 | abcW | (not set) | YES(Mask) | s=3 | (not write) | (not set) | NO |

FIG. 15

LCB        (100+x)h
LCW rA,    (104+x)h
SCB rA,    (200+y)h
LCW rA,    (108+x)h
SCW rA,    (204+y)h
LCE rA,    (10C+x)h
SCW rA,    (208+y)h
SCE        (20C+y)h

FIG. 16

LCB (100+x)h
LCE rA, (104+x)h
SCB rA, (200+y)h
SCE (204+y)h

PROCESSOR-BASED AUTOMATIC ALIGNMENT DEVICE AND METHOD FOR DATA MOVEMENT

BACKGROUND OF THE INVENTION

1. Field of the Invention

The present invention relates to the technical field of data processing and, more particularly, to a processor-based automatic alignment device and method for data movement.

2. Description of Related Art

For data processing, data alignment is concerned about the performances of key operations, such as string, array and the like. Upon this problem, U.S. Pat. No. 4,814,976 granted to Hansen, et al. for a "RISC computer with unaligned reference handling and method for the same" performs the alignment as loading or storing unaligned data and reads or writes the data completely by two times as it exceeds the boundary. However, such a processing not only wastes data bandwidth and affects the performance of processor but also causes long codes and wastes storage space. For example, in case of moving three words of data 'ABCDEFGHIJKL' starting with address (100+x)h in memory into positions starting with address (200+y)h in memory, where x, y=0, 1, 2 or 3, the required codes are shown in FIG. 1. FIGS. 2-5 respectively illustrate data source and destination addresses that are aligned or unaligned. FIG. 2 shows unaligned data source addresses and unaligned data destination addresses. FIG. 3 shows aligned data source addresses and unaligned data destination addresses. As shown in FIG. 3, when both instructions LWL rA, (100)h and LWR rA, (100+3)h fetch a word at memory address 100h and write it to register rA, it causes resource waste because same operations are performed. FIG. 4 shows unaligned data source addresses and aligned data destination addresses. As shown in FIG. 4, both instructions SWL rA, (200)h and SWR rA, (200+3)h write a value ABCD in the register rA to a word at memory address 200h, which also causes resource waste.

FIG. 5 shows aligned data source addresses and aligned data destination addresses. As shown in FIG. 5, both instructions LWL rA, (100)h and LWR rA, (100+3)h fetch a word at memory address 100h and write it into the register rA, and both instructions SWL rA, (200)h and SWR rA, (200+3)h write a value ABCD in the register rA to a word at memory address 200h, which repeats data read/write and thus severely affect performance.

As cited, if a required length of unaligned data to be loaded is n words, 4n instructions are used to describe read/write (move) operation. Also, at least 4n instruction cycles are used to complete the operation. Since repeated read/write is performed on a same memory position and a same register, processor pipeline is possibly stalled and bus bandwidth is wasted. Especially to some systems without cache, obvious delay can be caused. Therefore, it is desirable to provide an improved method and device to mitigate and/or obviate the aforementioned problems.

SUMMARY OF THE INVENTION

The object of the present invention is to provide a processor-based automatic alignment device and method for data movement, which can avoid the prior problem and reduce required instruction cycles to complete data movement, thereby increasing performance.

In accordance with one aspect of the present invention, there is provided a processor-based automatic alignment device for data movement, wherein unaligned data is stored in a memory at a first position and written to the memory at a second position. The memory has a plurality of m-bit words partitioned by word boundaries. The unaligned data stored in the memory at the first position is partitioned by word boundaries as a first part, a second part and a third part. The device essentially comprises: an internal register, a load combine register, a shifter, a rotator, a store combine register and a mask selector. The internal register temporarily stores data. The load combine register is coupled to the memory for temporarily storing data read out of the memory. The shifter is coupled to the load combine register and the memory for shifting in accordance with stored address of the unaligned data and storing a resulting data in the internal register. The rotator is coupled to the internal register for rotating data of the internal register to a second position in accordance with written address of the unaligned data. The store combine register is coupled to the rotator for temporarily storing data of the rotator. The mask selector is coupled to the rotator and the store combine register for selectively masking their data in accordance with the written address of the unaligned data and writing the data masked to the memory.

In accordance with another aspect of the present invention, there is provided a processor-based automatic alignment method for data movement, wherein unaligned data is stored in a memory at a first position and written to the memory at a second position. The memory has a plurality of m-bit words partitioned by word boundaries. The unaligned data stored in the memory at the first position is partitioned by word boundaries as a first part, a second part and a third part. The method includes: a first fetching step, a second fetching step, a first shifting step, a first rotating step, a first mask writing step, a third fetching step, a seconding shifting step, a second rotating step, a first writing step, a third rotating step, a second writing step and a second mask writing step. The first fetching step executes a first instruction to fetch a first word from the memory having the first part. The second fetching step executes a second instruction to fetch a second word from the memory having the second part. The first shifting step combines the first word and the second word and shifts the combined to a first load position to form a first load combination data, wherein first m bits of the first load combination data are written to a register of a processor. The first rotating step rotates data of the register to a first store position in accordance with written unaligned address, thereby generating a first rotated data. The first mask writing step masks the first rotated data in accordance with the written unaligned address and writes it to the memory. The third fetching step executes a third instruction to fetch a third word from the memory having the third part. The second shifting step combines part of the first load combination data that is not written to the register and the third word. The second rotating step rotates data of the register to the first store position in accordance with written unaligned address, thereby generating a second rotated data. The first writing step combines unwritten part of the first rotated data and a part of the second rotated data and writes the combined to the memory. The third rotating step rotates part of the second load combination data, which is not written to the register, to the first position. The second writing step combines unwritten part of the second rotated data and a part of the third rotated data. The second mask writing step masks the third rotated data and writes it to the memory.

In accordance with a further aspect of the present invention, there is provided a processor-based automatic alignment method for data movement, wherein unaligned data is stored in a memory at a first position and written to the memory at a second position. The memory has a plurality of m-bit words partitioned by word boundaries. The unaligned data stored in the memory at the first position is partitioned by word boundaries as a first part, a second part and a third part. The method includes: a fetch start step, a fetch end step, a first shifting step, a first rotating step, a first mask writing step and a second mask writing step. The fetch start step executes a first instruction to fetch a first word from the memory having the first part. The fetch end step executes a third instruction to fetch a second word from the memory having the second part. The first shifting step combines the first word and the second word and shifts the combined to a first load position to form a first load combination data. The first rotating step rotates the first load combination data to a first store position in accordance with written unaligned address, thereby generating a first rotated data. The first mask writing step masks the first rotated data in accordance with written unaligned address and writes it to the memory. The second mask writing step masks unwritten part of the first rotated data and writes it to the memory.

Other objects, advantages, and novel features of the invention will become more apparent from the following detailed description when taken in conjunction with the accompanying drawings.

BRIEF DESCRIPTION OF THE DRAWINGS

FIG. 1 is a schematic view of program codes for shifting an unaligned data in the prior art;

FIG. 7 shows a table of instructions formats in accordance with the invention;

FIG. 8 schematically illustrates LCB instruction in accordance with the invention;

FIG. 11 shows a table of executing LCB, LCW and LCE instructions in accordance with the invention;

FIG. 15 is a table of executing SCB, SCW and SCE instructions in accordance with the invention;

FIG. 16 shows a graph of a set of program codes in accordance with the invention;

FIG. 21 shows a graph of another set of program codes in accordance with the invention;

DETAILED DESCRIPTION OF THE PREFERRED EMBODIMENT

Figure 2:
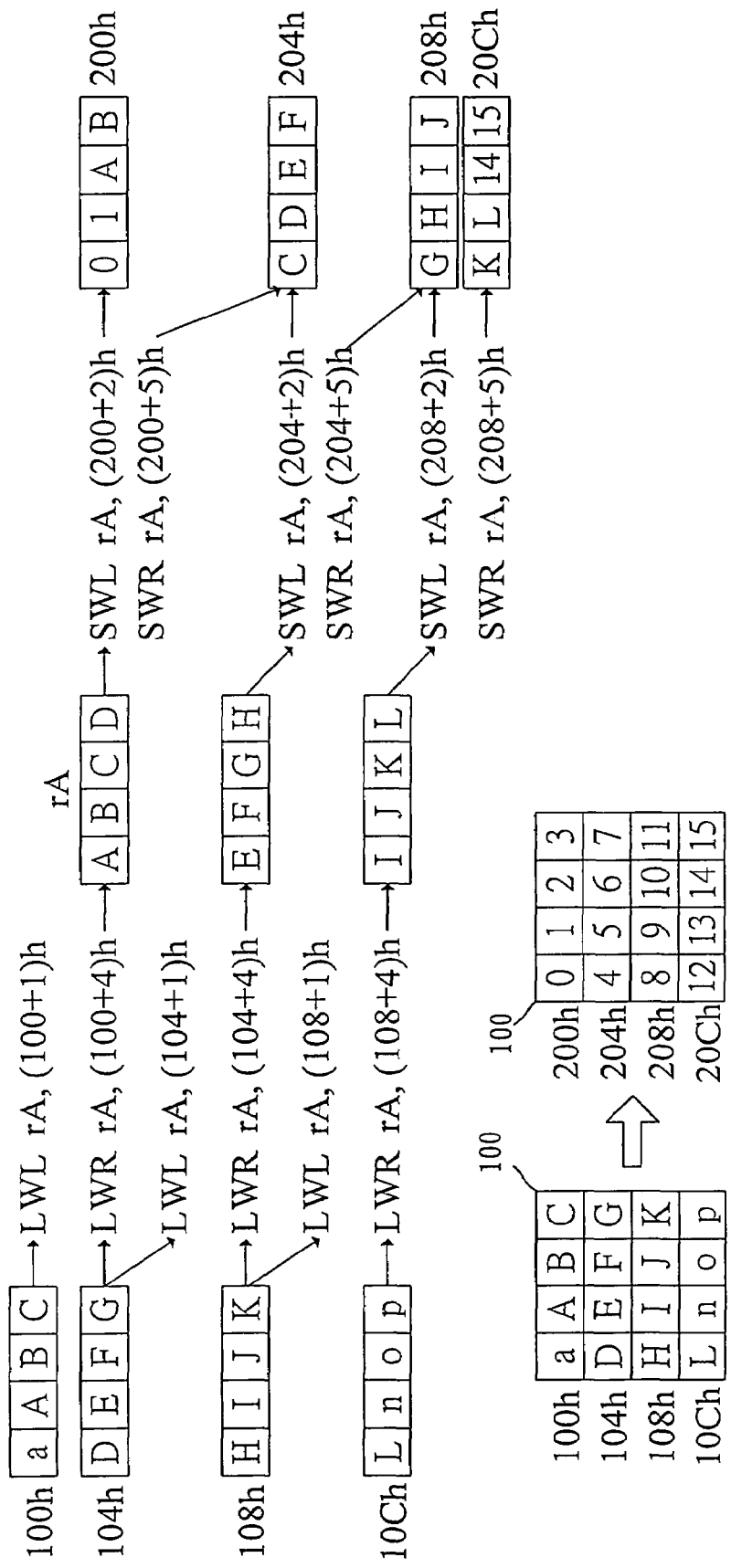
FIG. 2 is a schematic view of unaligned data source addresses and unaligned data destination addresses in the prior art.
Figure 3:
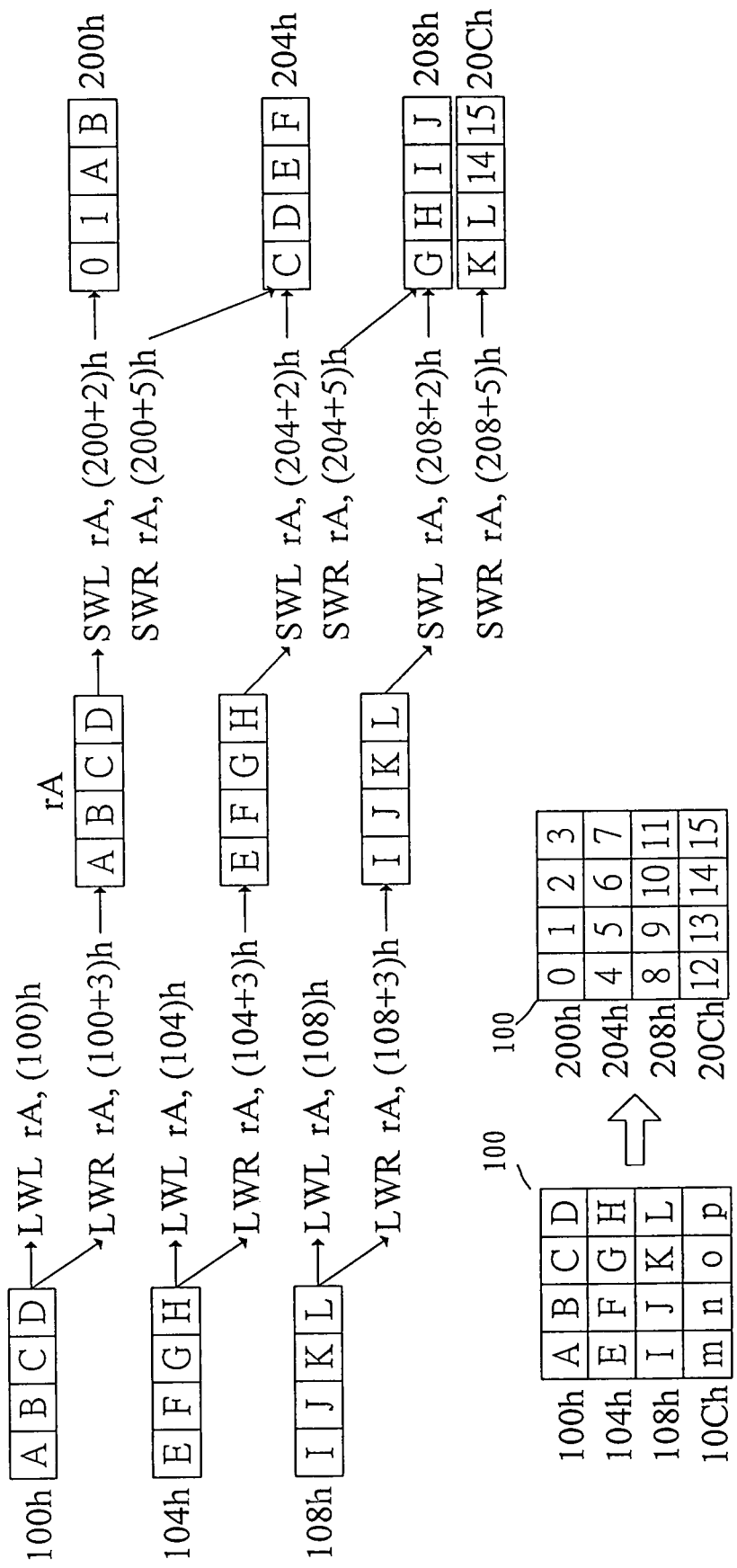
FIG. 3 is a schematic view of aligned data source addresses and unaligned data destination addresses in the prior art.
Figure 4:
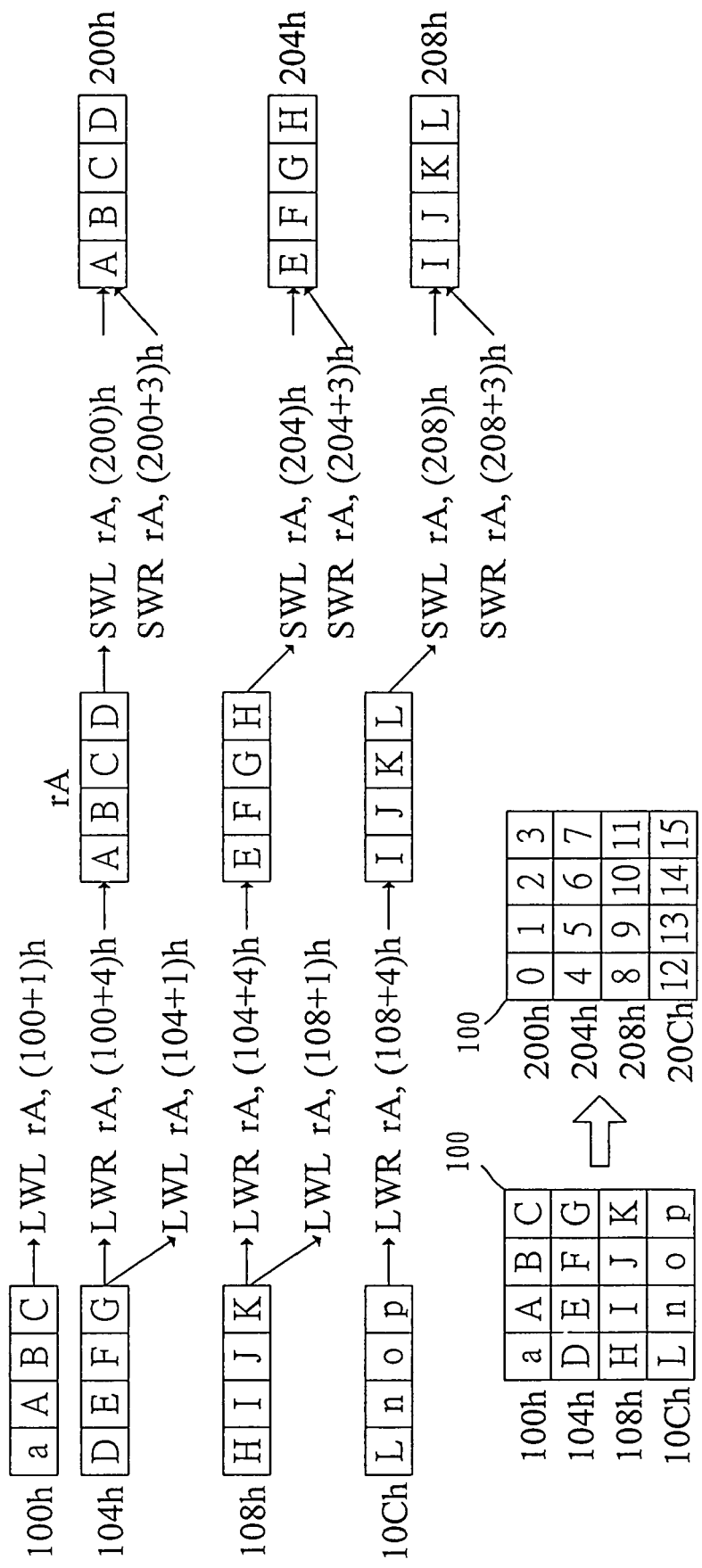
FIG. 4 is a schematic view of unaligned data source addresses and aligned data destination addresses in the prior art.
Figure 5:
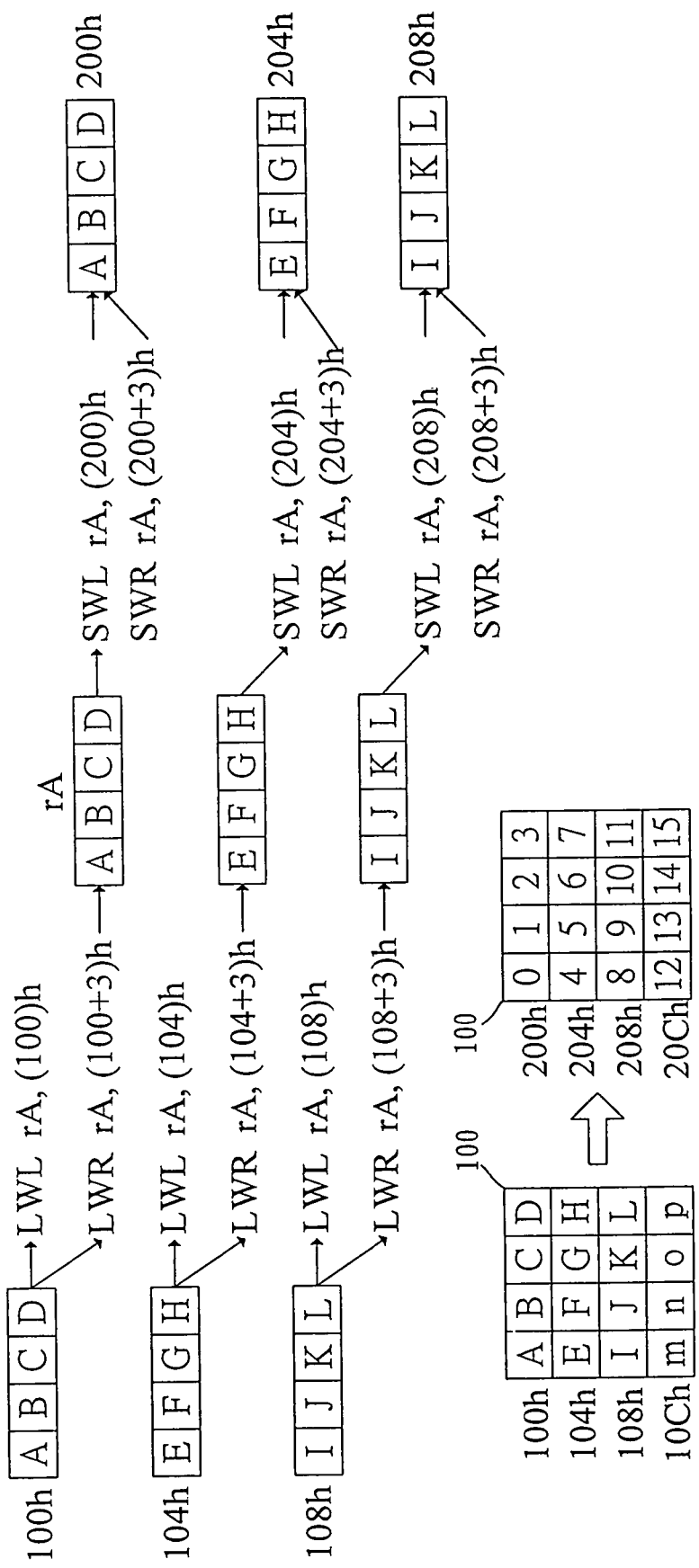
FIG. 5 is a schematic view of aligned data source addresses and aligned data destination addresses.
Figure 6:
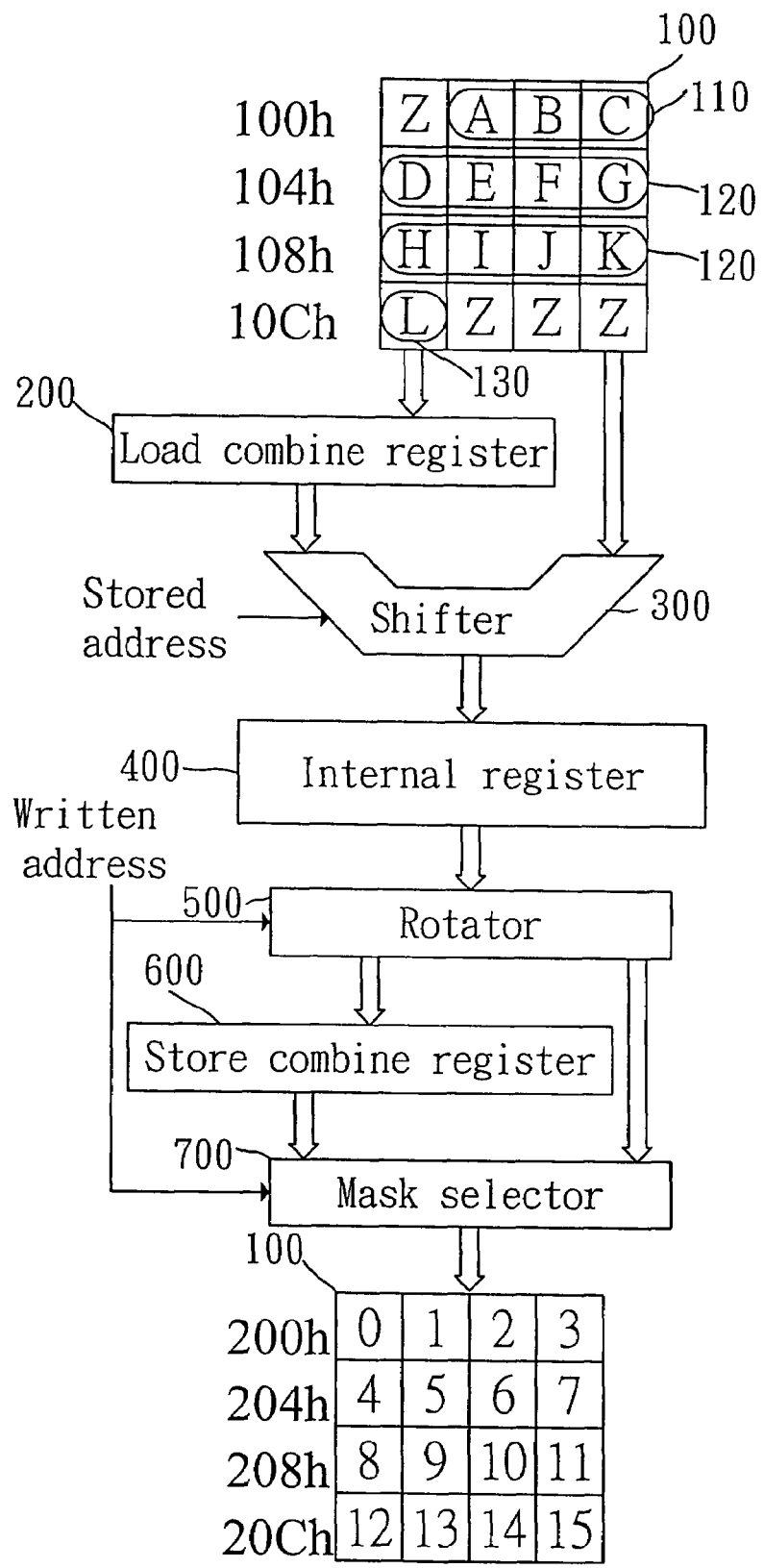
FIG. 6 is a block diagram of a processor-based automatic alignment device for data movement in accordance with the invention.

FIG. 6 is a block diagram of a processor-based automatic alignment device for data movement among memory 100 in accordance with the invention, which uses instructions of a processor to automatically align data moved and unaligned. In FIG. 6, the device includes a load combine register (LDCR) 200, a shifter 300, an internal register 400, a rotator 500, a store combine register (STCR) 600 and a mask selector 700. The memory 100 has a plurality of m-bit words partitioned by word boundaries. In this embodiment, m is preferred to be 32, i.e., the memory 100 consists of a plurality of 32-bit words.

Data 'ABCDEFGHIJKL' is stored in the memory 100 at first position, which is partitioned by word boundaries into a first part 110, a second part 120 and a third part 130. The data is read and stored in the internal register 400 (R16) of the processor and then written to an unaligned position in the memory 100.

The LDCR 200 is coupled to the memory 100 for temporarily storing data read out of the memory 100. The shifter 300 is coupled to the LDCR 200 and the memory 100 for shifting in accordance with stored address of the data and storing a resulting data in the internal register 400. The internal register 400 can store data temporarily.

The rotator 500 is coupled to the internal register 400 for rotating data of the internal register 400 to a first position in accordance with written address of the data. The STCR 600 is coupled to the rotator 500 for temporarily storing data of the rotator 500. The mask selector 700 is coupled to the rotator 500 and the STCR 600 for selectively masking their data in accordance with the written address of the data and writing the data masked to the memory 100 at a second position.

Three load instructions, Load Combine Begin (LCB), Load Combine Word (LCW) and Load Combine End (LCE), are defined by the inventive device in order to generate corresponding control signals to the LDCR 200 and the shifter 300. Also, three store instructions, Store Combine Begin (SCB), Store Combine Word (SCW) and Store Combine End (SCE), are defined by the inventive device in order to generate corresponding control signals to the rotator 500, the STCR 600 and the mask selector 700. Formats of the instructions are shown in FIG. 7.

Instruction LCB [Addr] loads memory content at stored address Addr to the LDCR 200 in the processor for reading the first part 110 of the data. As shown in FIG. 8, LCB [101h] loads the contents 'ZABC' of addresses 100h-103h that includes address 101h to the LDCR 200.

Figure 9:
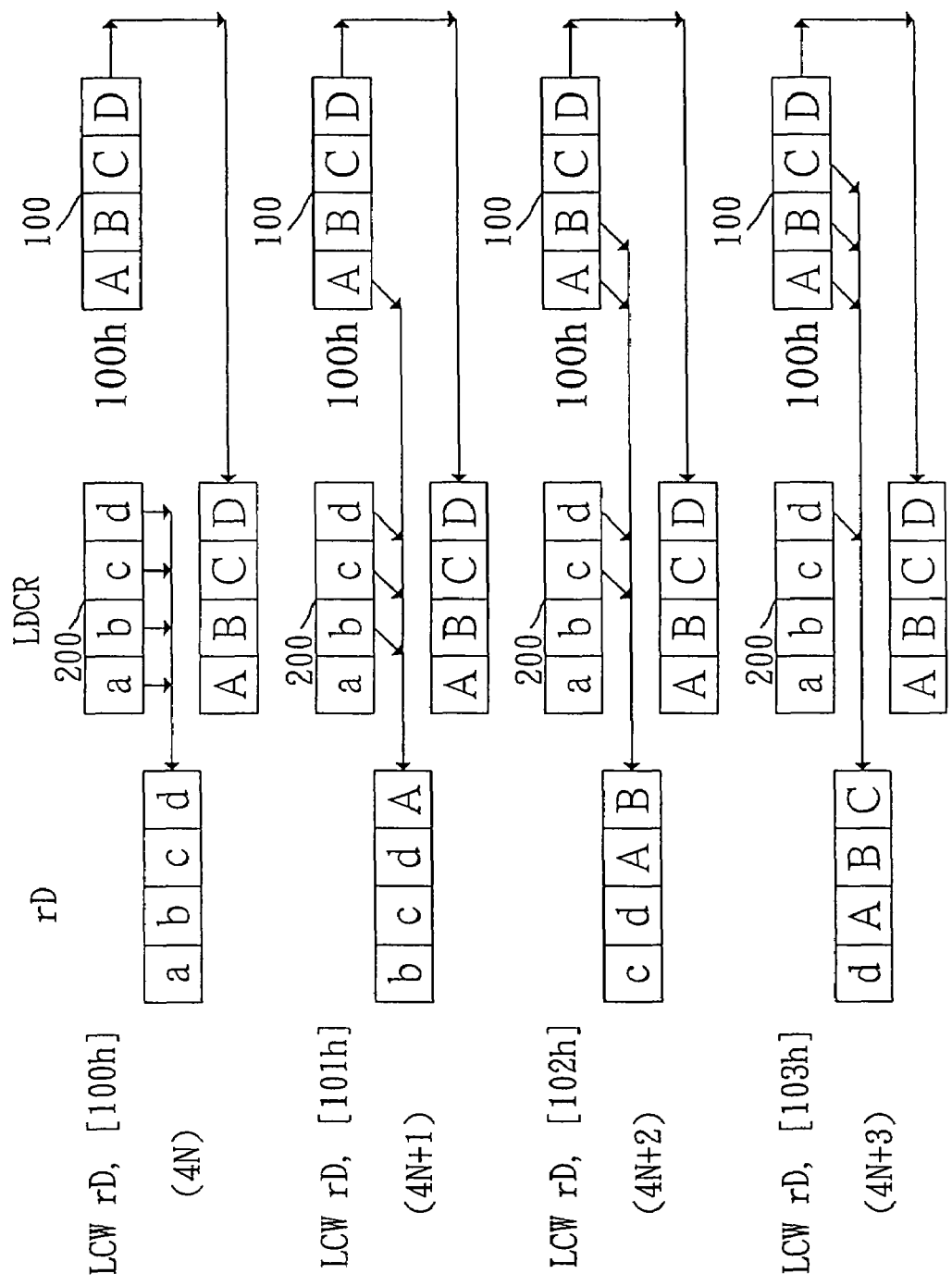
FIG. 9 schematically illustrates LCW instruction in accordance with the invention.

As shown in FIG. 9, instruction LCW rD, [Addr] firstly combines memory content at stored address Addr and the content of the LDCR 200, then shifts the combined left in accordance with the stored address Addr, and finally writes the combined shifted to register rD. At this point, the memory content at the address Addr is loaded to the LDCR 200, wherein when Addr=4N (positive integer), no shift is performed; when Addr=4N+1, shifting left by eight bits is performed; when Addr=4N+2, shifting left by 16 bits is performed; and when Addr=4N+3, shifting left by 24 bits is performed. Thus, the second part 120 of the data is read in the processor.

Figure 10:
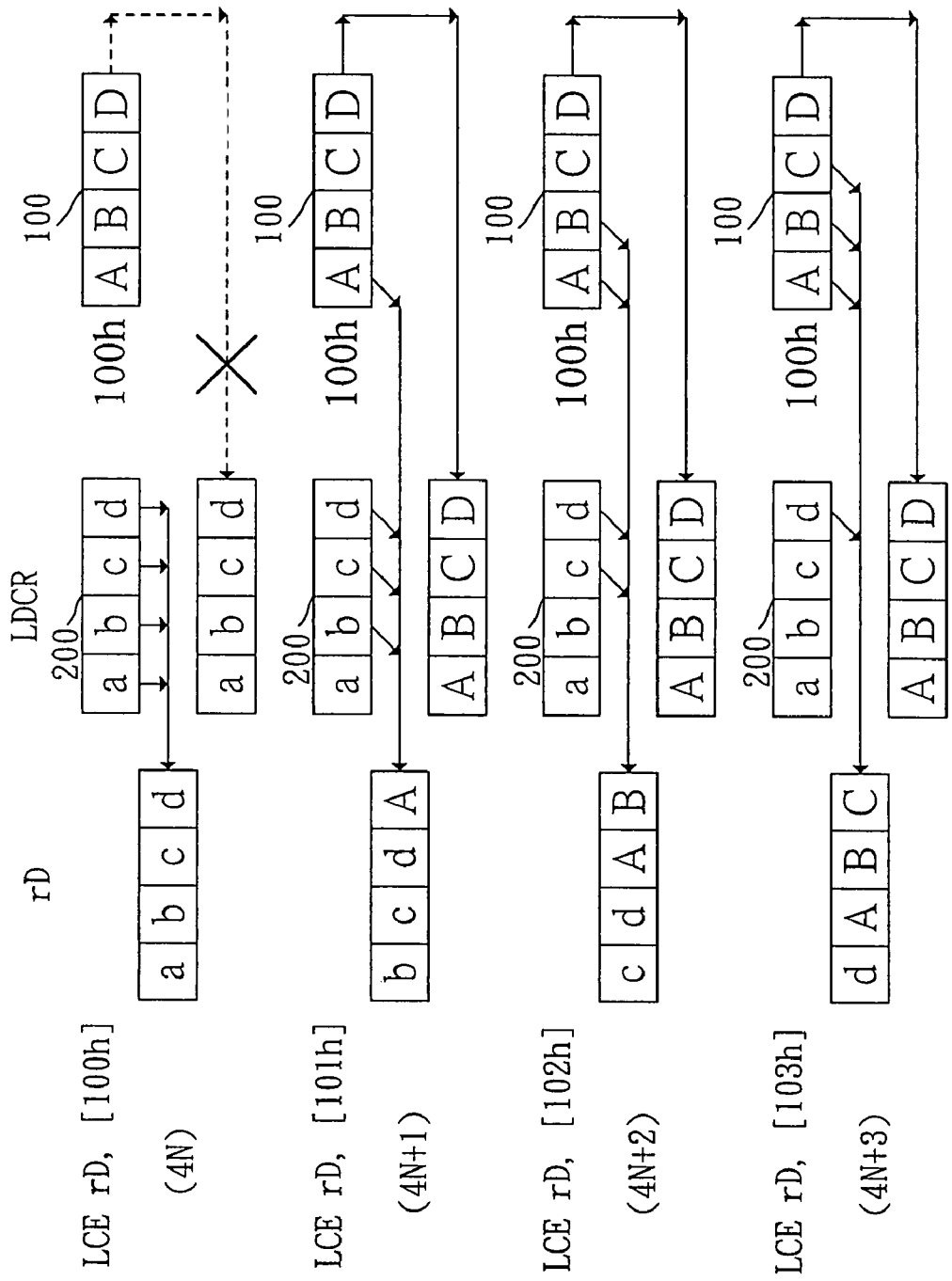
FIG. 10 schematically illustrates LCE instruction in accordance with the invention.

As shown in FIG. 10, for instruction LCE rD, [Addr], when Addr=4N, the content of the LDCR 200 is written in register rD directly but memory content at stored address Addr is not loaded to the LDCR 200. When Addr is not 4N, the memory content at the stored address Addr and the content of the LDCR 200 are combined to further write to the register rD after shifting left in accordance with the stored address Addr. At this point, the memory content at the address Addr is loaded to the LDCR 200, wherein when Addr=4N+1 (N is positive integer), shifting left by eight bits is performed; when Addr=4N+2, shifting left by 16 bits is performed; and when Addr=4N+3, shifting left by 24 bits is performed. Thus, the third part 130 of the data is read in the processor.

FIG. 11 shows a summary table of executing the instructions LCB [Addr], LCW rD, [Addr] and LCE rD, [Addr] under data arrangement of little endian and big endian. As shown in FIG. 11, for data abcd in the LDCR 200 and data ABCD in the memory, s=0 represents Addr=4N, s=1 represents Addr=4N+1, s=2 represents Addr=4N+2, and s=3 represents Addr=4N+3.

Figure 12:
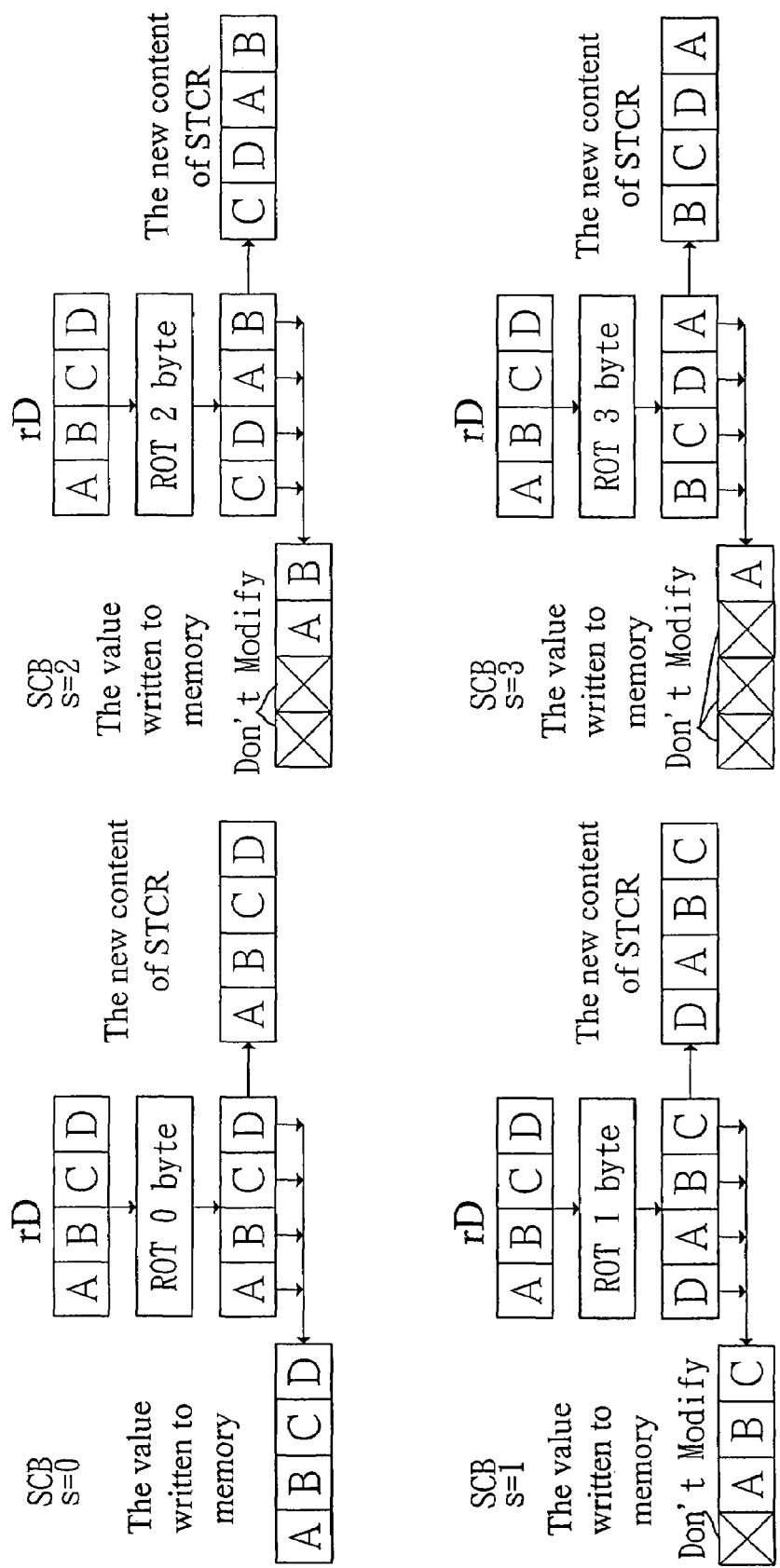
FIG. 12 schematically illustrates SCB instruction in accordance with the invention.

As shown in FIG. 12, instruction SCB rD, [Addr] rotates the content of the register rD by 0-, 1-, 2- and 3-byte respectively in accordance with written address Addr (s=Addr[1:0]) and writes the content rotated to the STCR 600. In addition, the rotated content is masked by 0-, 1-, 2- and 3-byte respectively in accordance with the written address Addr(s=Addr[1:0]) and written to the memory 100. For example, instruction SCB R16, [101 h] rotates the content of register R16 by one byte in accordance with written address 101h(s=1) and writes the rotated content to the STCR 600. In addition, the rotated content is masked by one byte and written to the memory 100 at address 101h. Thus, when the content of the register R16 is ABCD and the execution of SCB R16, [101h] is complete, the content of the STCR 600 is DABC, the contents of addresses 101h to 103h are ABC, and the content of address 100h is unchanged.

Figure 13:
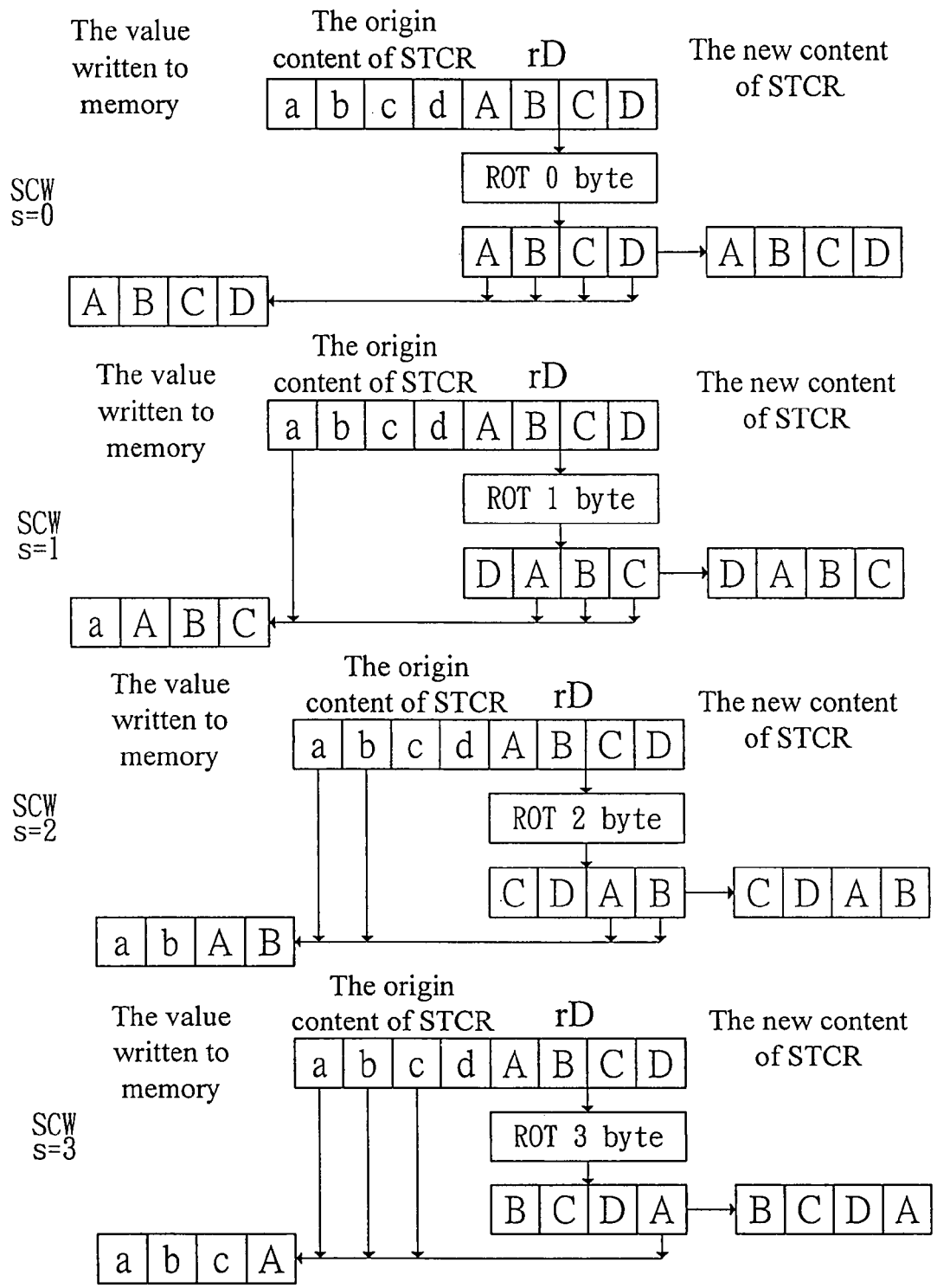
FIG. 13 schematically illustrates SCW instruction in accordance with the invention.

As shown in FIG. 13, instruction SCW rD, [Addr] rotates and then masks the content of the register rD by 0-, 1-, 2- and 3-byte respectively in accordance with written address Addr (s=Addr[1:0]), next combines the masked content and bytes stored in the STCR 600 and writes the combined content to the memory 100, and finally writes the rotated content in the register rD to the STCR 600. For example, instruction SCW R16, [101h] rotates the content 'ABCD' of register R16 by one byte in accordance with written address 101h(s=1) into the content 'DABC' and masks the content 'DABC' by one byte 'D' in accordance with written address 101h(s=1), next combines bytes 'abcd' stored in the STCR 600 and the content masked into the content 'aABC' and writes the content 'aABC' to the memory 100 at address 101h, and finally writes the content 'DABC' to the STCR 600. Thus, when the execution of SCB R16, [101h] is complete, the content of the STCR 600 is 'DABC', the contents of addresses 101h to 103h are 'ABC', and the content of address 10h is 'a'.

Figure 14:
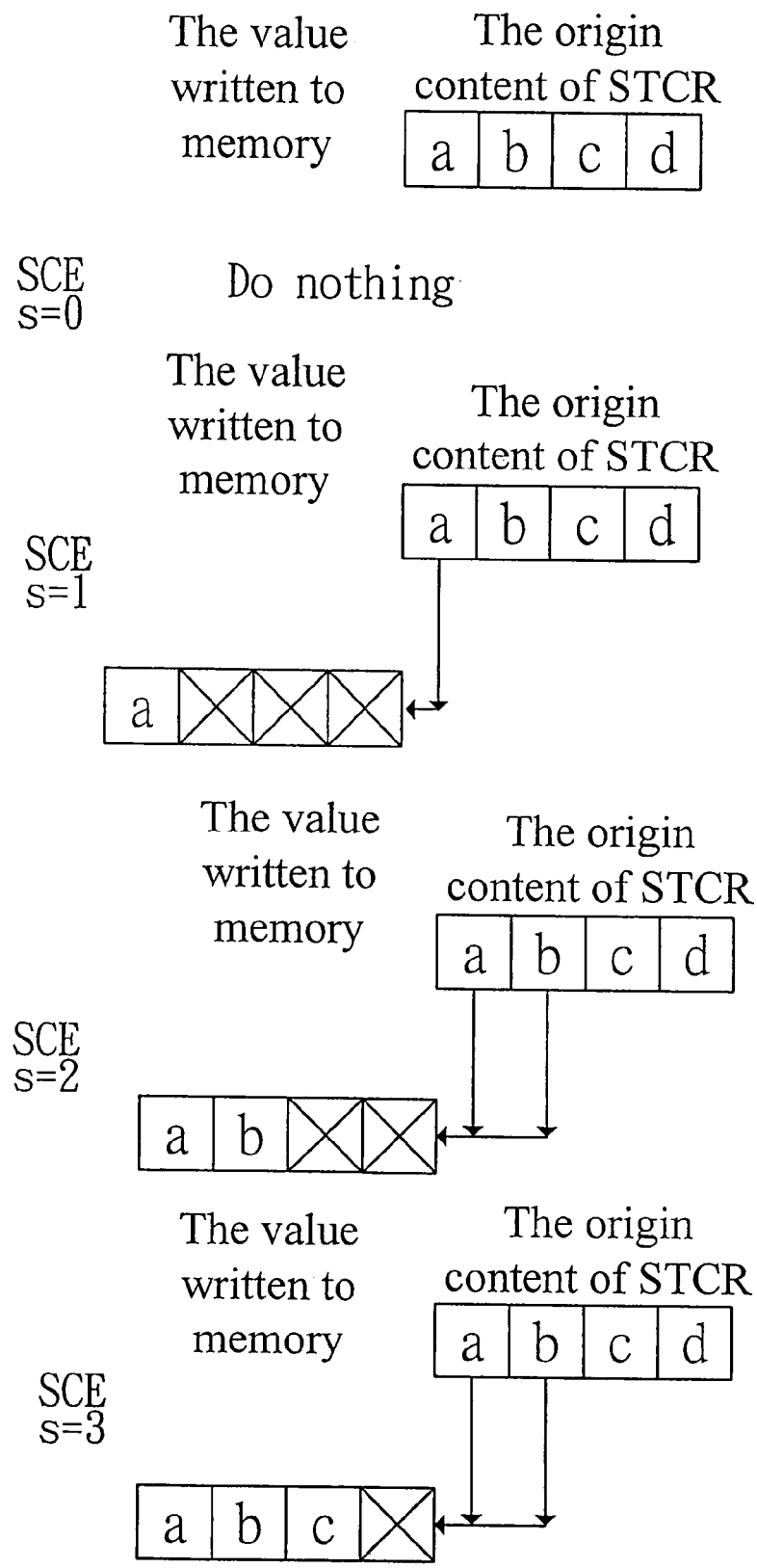
FIG. 14 schematically illustrates SCE instruction in accordance with the invention.

As shown in FIG. 14, instruction SCE [Addr] masks the content of the STCR 600 by 0-, 1-, 2- and 3-byte respectively in accordance with written address Addr(s=Addr[1:0]) and writes the masked content to the memory 100. For example, instruction SCE [101h] masks the content 'abcd' by three bytes 'bcd' in accordance with written address 101h(s=1) and writes the masked content ('a') to the memory 100 at address 100h. Thus, when the execution of SCE [101h] is complete, in the memory 100, the contents of addresses 101h to 103h are unchanged and the content of address 100h is 'a'.

FIG. 15 shows a summary table of executing the instructions SCB rD, [Addr], SCW rD, [Addr] and SCE [Addr] under data arrangement of little endian and big endian. As shown, for data 'abcd' in the STCR 600 and data 'XYZW' in the memory 100 at addresses 100h to 103h, s=0 represents Addr=4N (positive integer), s=1 represents Addr=4N+1, s=2 represents Addr=4N+2, and s=3 represents Addr=4N+3.

Figure 17:
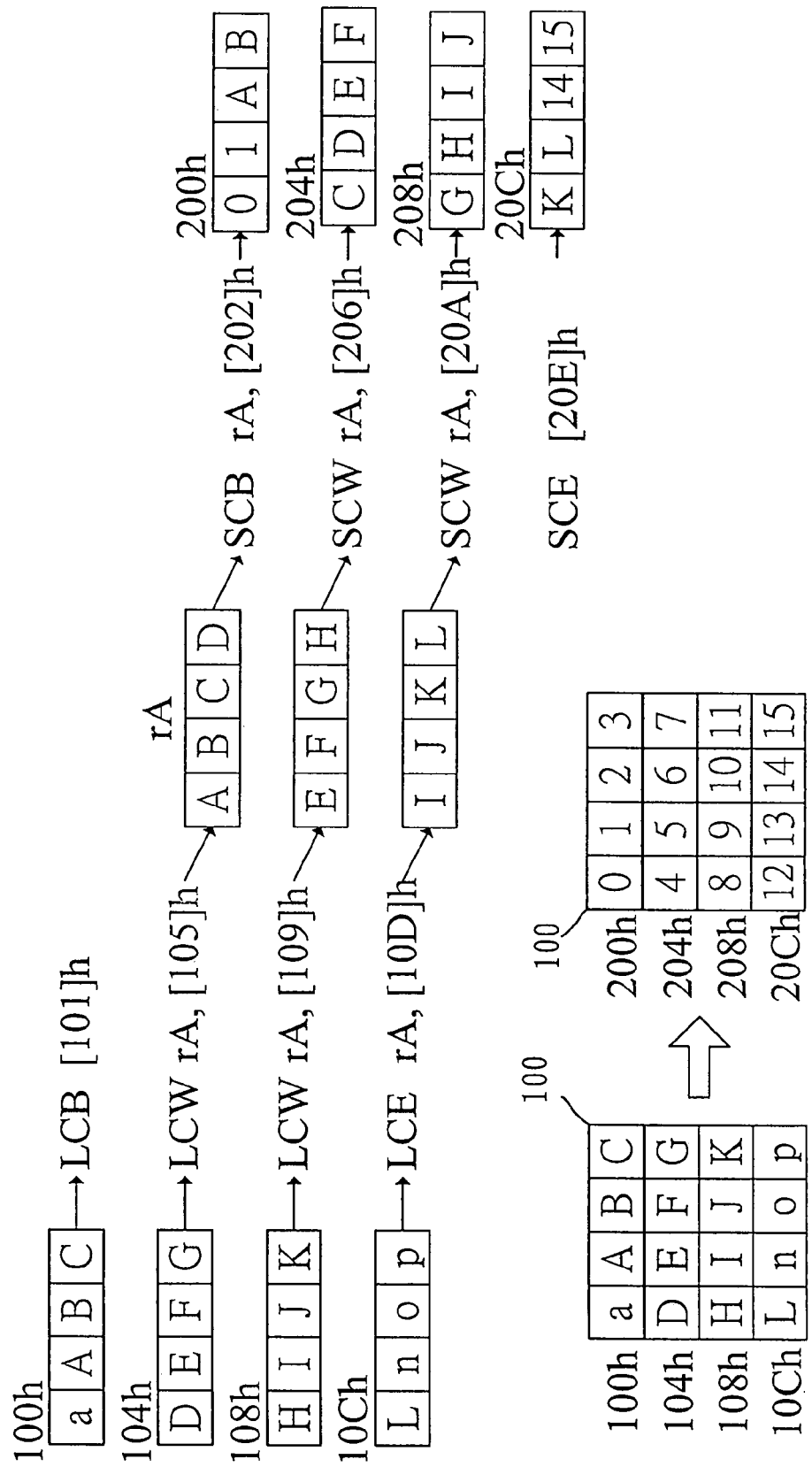
FIG. 17 shows a graph of unaligned source addresses and unaligned destination addresses as shifting a set of data in accordance with the invention.

FIG. 16 is a schematic view of a set of program codes in accordance with the invention. As shown, first three words of data 'ABCDEFGHIJKL' starting with address (100+x)h in the memory 100 are moved to position starting with addresses (200+y)h in the memory 100, where x and y can be 0, 1, 2 or 3. FIGS. 17 to 20 respectively show if data source and destination addresses are aligned or not. FIG. 17 is a schematic view of unaligned source addresses and unaligned destination addresses, i.e., x=1, y=2.

Figure 18:
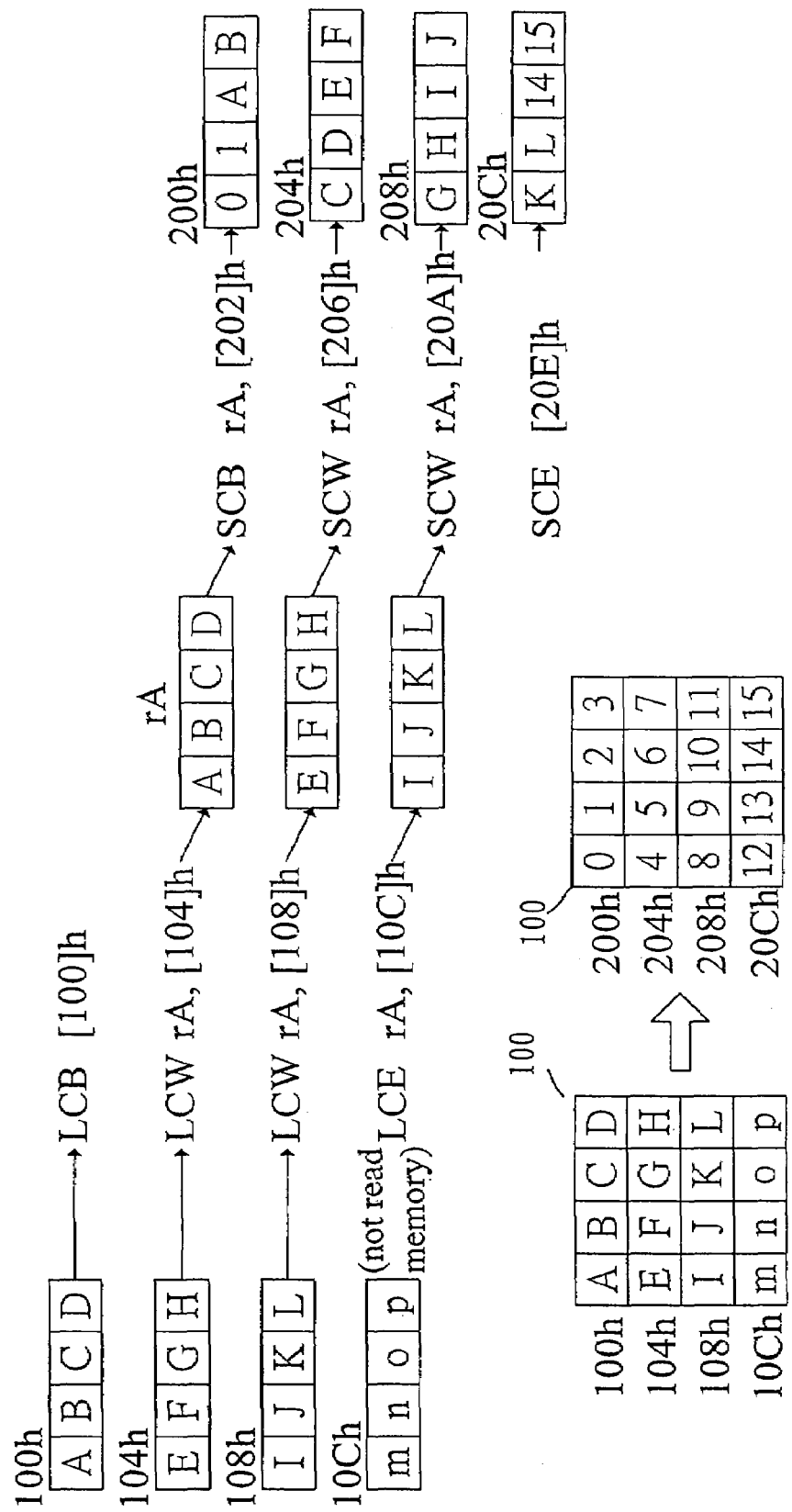
FIG. 18 shows a graph of aligned source addresses and unaligned destination addresses as shifting a set of data in accordance with the invention.

FIG. 18 is a schematic view of aligned source addresses and unaligned destination addresses, i.e., x=0, y=2. At this point, instruction LCD rA, [10C]h does not read data out of the memory 100, so that load operation is performed on the memory 100 three times only.

Figure 19:
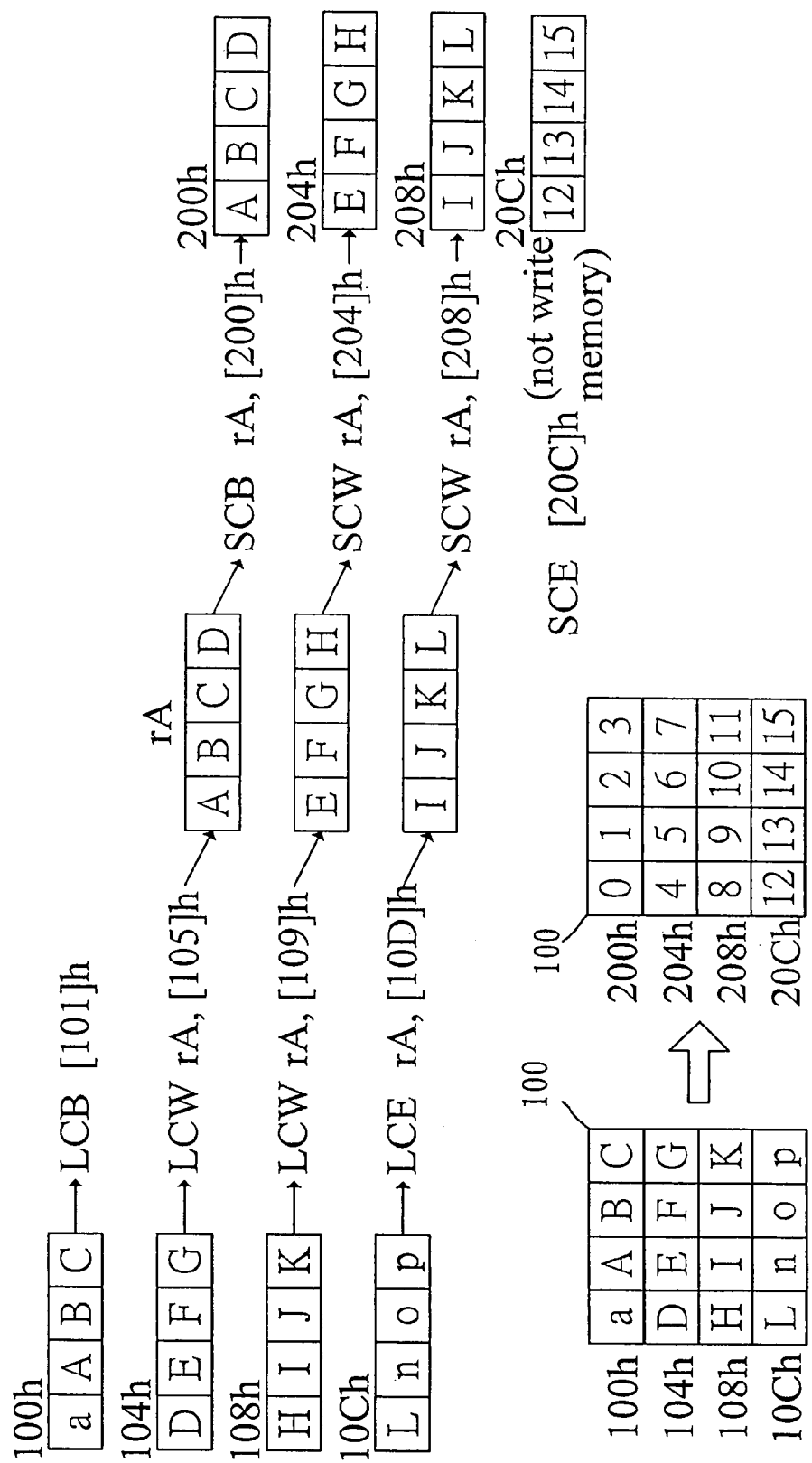
FIG. 19 shows a graph of unaligned source addresses and aligned destination addresses as shifting a set of data in accordance with the invention.

FIG. 19 is a schematic view of unaligned source addresses and aligned destination addresses, i.e., x=1, y=0. At this point, instruction SCE [20C]h does not performs write (store) operation on the memory 100, so that store operation is performed on the memory 100 three times only.

Figure 20:
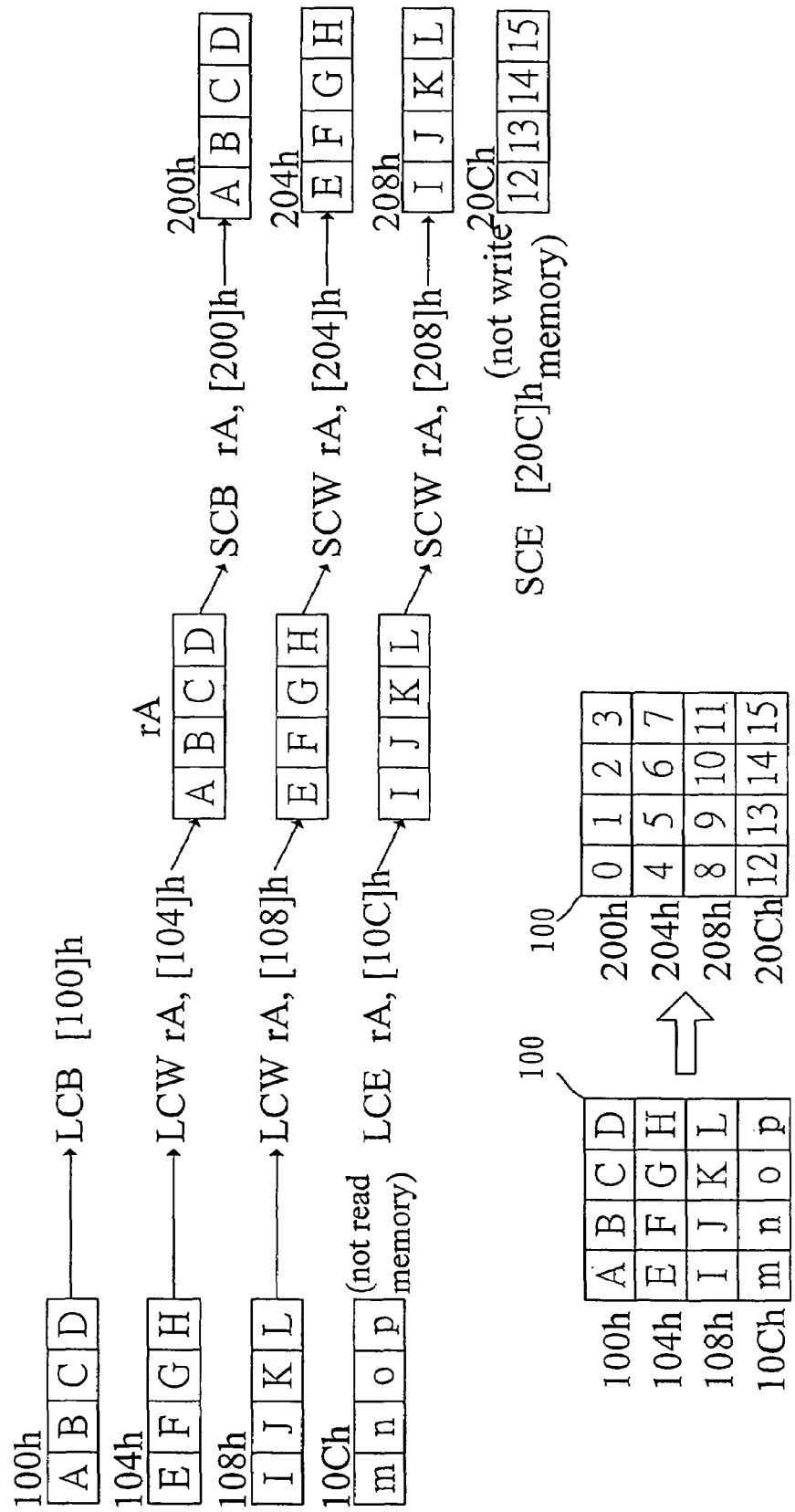
FIG. 20 shows a graph of aligned source addresses and aligned destination addresses as shifting a set of data in accordance with the invention.

FIG. 20 is a schematic view of aligned source addresses and aligned destination addresses, i.e., x=0, y=0. At this point, instruction LCD rA, [10C]h does not read data out of the memory 100 so that load operation is performed on the memory 100 three times only, and instruction SCE [20C]h does not performs write (store) operation on the memory so that store operation is performed on the memory 100 three times only.

Figure 22:
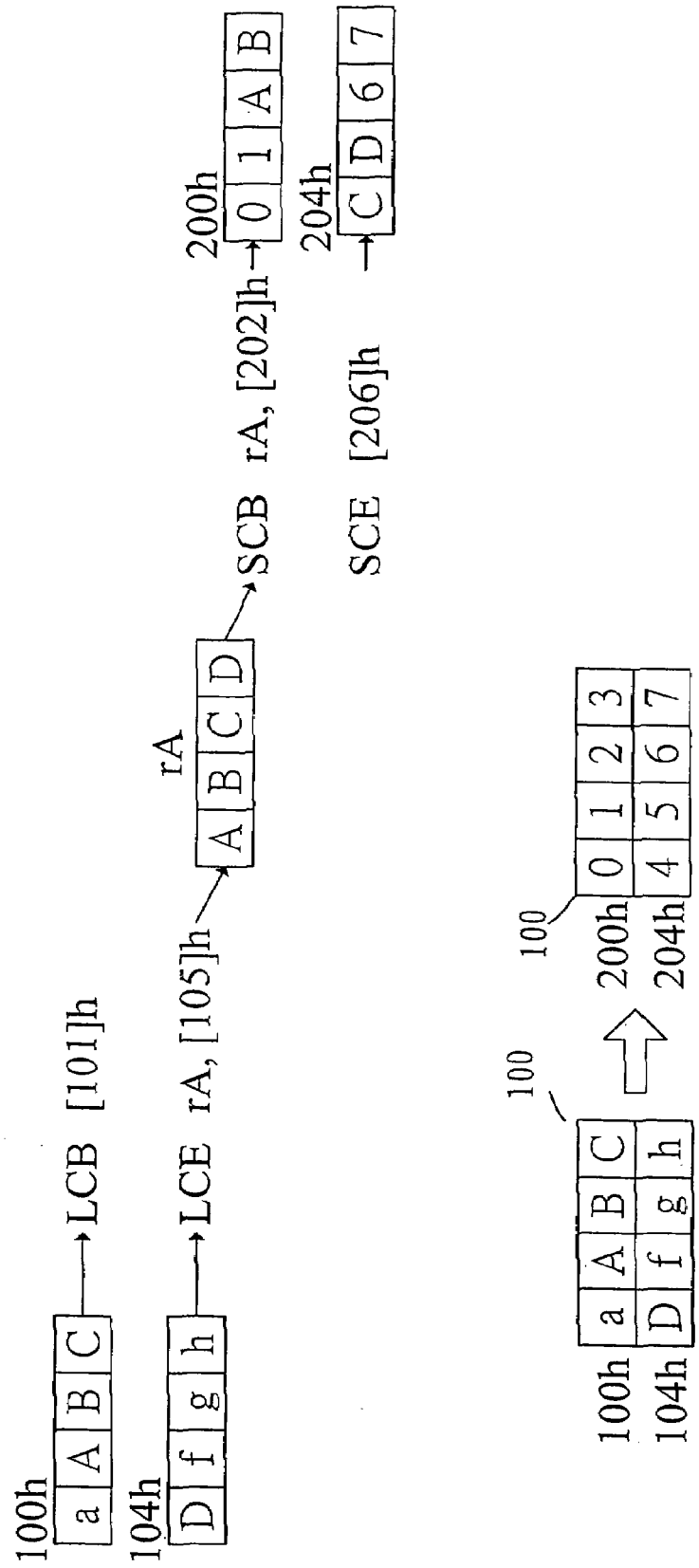
FIG. 22 shows a graph of unaligned source addresses and unaligned destination addresses as shifting a word of data in accordance with the invention.

FIG. 21 shows a schematic view of another set of program codes in accordance with the invention. As shown, the word of data 'ABCD' at address (100+x)h in the memory 100 is moved to position at addresses (200+y)h in the memory 100, where x and y can be 0, 1, 2 or 3. FIGS. 22 to 25 respectively illustrate the situations that data source and destination addresses are aligned or not. FIG. 22 shows a schematic of unaligned source addresses and unaligned destination addresses, i.e., x=1, y=2.

Figure 23:
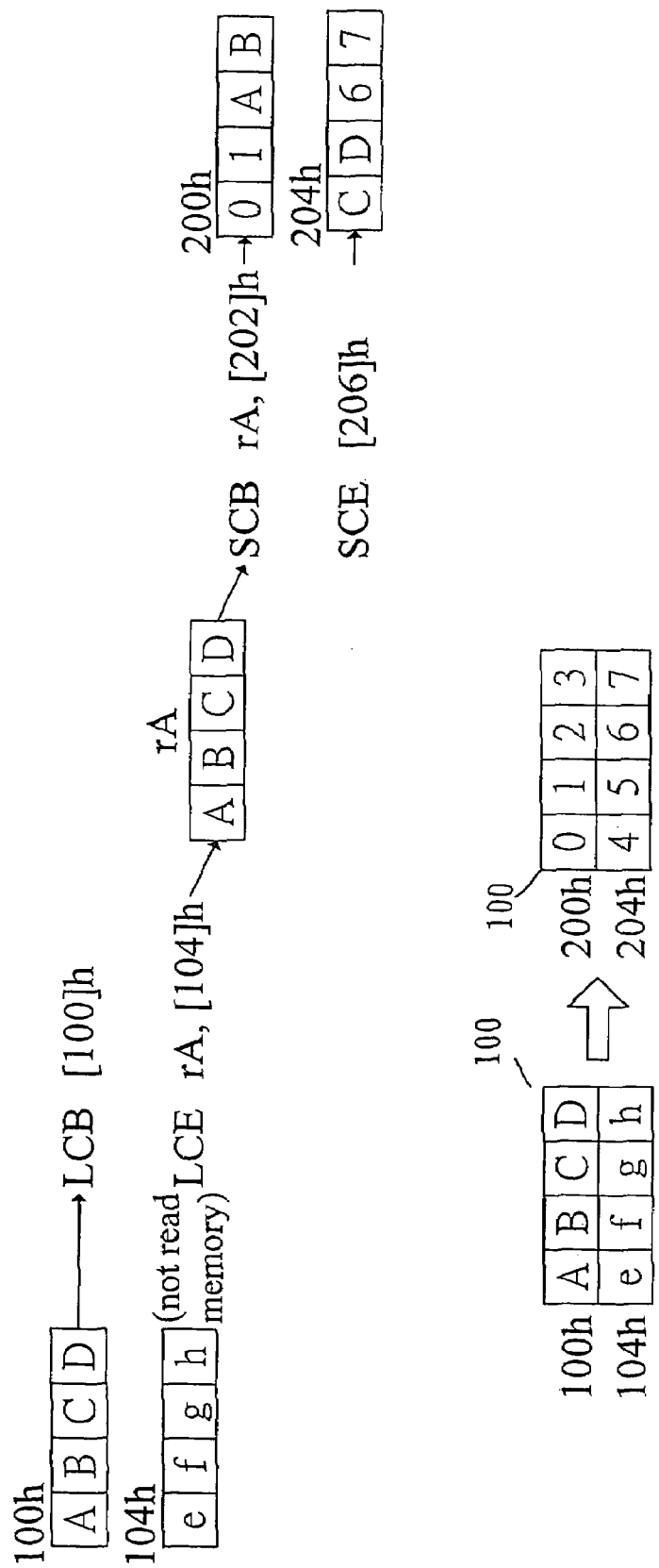
FIG. 23 shows a graph of aligned source addresses and unaligned destination addresses as shifting a word of data in accordance with the invention.

FIG. 23 is a schematic of aligned source addresses and unaligned destination addresses, i.e., x=0, y=2. At this point, instruction LCD rA, [104]h does not read data out of the memory 100, so that load operation is performed on the memory 100 one time only.

Figure 24:
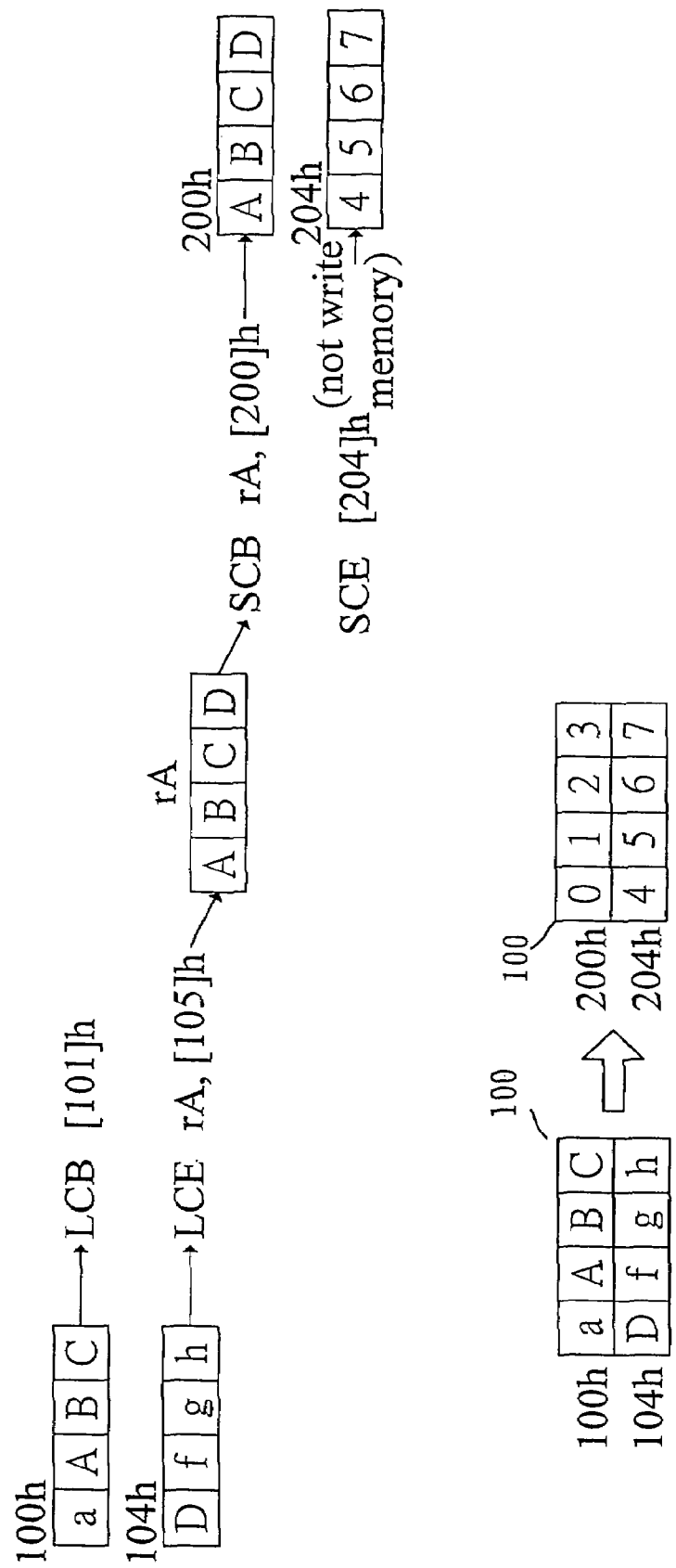
FIG. 24 shows a graph of unaligned source addresses and aligned destination addresses as shifting a word of data in accordance with the invention.

FIG. 24 is a schematic of unaligned source addresses and aligned destination addresses, i.e., x=1, y=0. At this point, instruction SCE [204]h does not performs any write (store) operation on the memory, so that store operation is performed on the memory 100 one time only.

Figure 25:
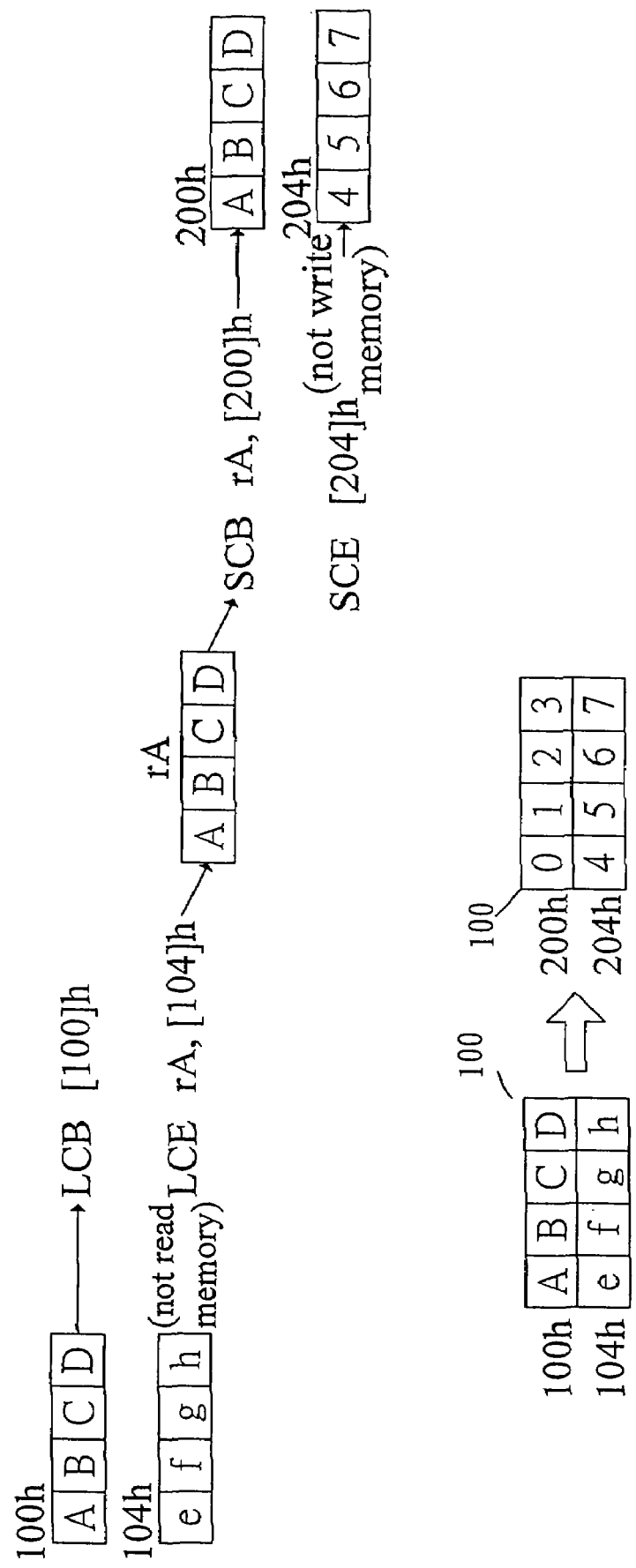
FIG. 25 shows a graph of aligned source addresses and aligned destination addresses as shifting a word of data in accordance with the invention.

FIG. 25 is a schematic of aligned source addresses and aligned destination addresses, i.e., x=0, y=0. At this point, instruction LCD rA, [104]h does not read data out of the memory 100 so that load operation is performed on the memory 100 one time only, and instruction SCE [204]h does not performs any write (store) operation on the memory so that store operation is performed on the memory 100 one time only.

In view of the foregoing, it is known that, when moving n-word data, no matter that addresses for loading or storing data are aligned, the invention can describe the move operation only by 2n+2 instructions, which can reduce codes and relatively increase performance. In addition, repeated read/write does not occur on a same memory or register position, and thus the stall probability of a processor pipeline is reduced. Further, a same memory position is read and written only one time at a pinch, and thus bus bandwidth is saved to reach to the best utilization.

Although the present invention has been explained in relation to its preferred embodiment, it is to be understood that many other possible modifications and variations can be made without departing from the spirit and scope of the invention as hereinafter claimed.

What is claimed is:

1. A processor-based automatic alignment device for data movement, wherein unaligned data is stored in a memory at a first position and written to the memory at a second position, the memory has a plurality of m (positive integer)-bit words partitioned by word boundaries, and the unaligned data stored in the memory at the first position is partitioned by word boundaries as a first part, a second part and a third part, the device comprising:
   an internal register, which temporarily stores data;
   a load combine register, which is coupled to the memory for temporarily storing data read out of the memory;
   a shifter, which is coupled to the load combine register and the memory for shifting in accordance with stored address of the unaligned data and storing a resulting data in the internal register;
   a rotator, which is coupled to the internal register for rotating data of the internal register to a second position in accordance with written address of the unaligned data;
   a store combine register, which is coupled to the rotator for temporarily storing data of the rotator; and
   a mask selector, which is coupled to the rotator and the store combine register for selectively masking their data in accordance with the written address of the unaligned data and writing the masked data to the memory.

2. The device as claimed in claim 1, wherein the shifter applies shift operation for shifting the load combine register and the memory.

3. The device as claimed in claim 1, wherein the shifter applies rotation operation for shifting the load combine register and the memory.

4. The device as claimed in claim 1, wherein the first part and the third part have a size less than m bits respectively.

5. The device as claimed in claim 1, wherein the first part has a size equal to m bits.

6. The device as claimed in claim 1, wherein m is 32.

7. The device as claimed in claim 1, wherein the shifter shifts the data left by 8k bits, where k is a positive integer.

8. The device as claimed in claim 1, wherein the rotator rotates the data right by 8k bits, where k is a positive integer.

9. A processor-based automatic alignment method for data movement, wherein unaligned data is stored in a memory at a first position and written to the memory at a second position, the memory has a plurality of m (positive integer)-bit words partitioned by word boundaries, and the unaligned data stored in the memory at the first position is partitioned by word boundaries as a first part, a second part and a third part, the method comprising:
   a first fetching step, which executes a first instruction to fetch a first word from the memory having the first part;
   a second fetching step, which executes a second instruction to fetch a second word from the memory having the second part;
   a first shifting step, which combines the first word and the second word and shifts the combined to a first load position to form a first load combination data, and first m bits of the first load combination data are written to a register of a processor;
   a first rotating step, which rotates data of the register to a first store position in accordance with written unaligned address, thereby generating a first rotated data;
   a first mask writing step, which masks the first rotated data in accordance with the written unaligned address and writes it to the memory;
   a third fetching step, which executes a third instruction to fetch a third word from the memory having the third part;
   a second shifting step, which combines part of the first load combination data that is not written to the register and the third word to form a second load combination data, and writes first m bits of the second load combination data to the register of a processor;
   a second rotating step, which rotates data of the register to the first store position in accordance with the written unaligned address, thereby generating a second rotated data;
   a first writing step, which combines unwritten part of the first rotated data and a part of the second rotated data and writes the combined to the memory;
   a third rotating step, which rotates part of the second load combination data, which is not written to the register, to the first position, thereby generating a third rotated data;
   a second writing step, which combines unwritten part of the second rotated data and a part of the third rotated data;
   a second mask writing step, which masks the third rotated data and writes it to the memory.

10. The method as claimed in claim 9, wherein the first shifting step applies a shift operation to the combined first word and second word.

11. The method as claimed in claim 9, wherein the first shifting step applies a rotation operation to the combined first word and second word.

12. The method as claimed in claim 9, wherein the first part and the third part have a size less than m bits respectively.

13. The method as claimed in claim 9, wherein the first part has a size equal to m bits.

14. The method as claimed in claim 9, wherein m is 32.

15. The method as claimed in claim 9, wherein the first shifting step shifts the combined first word and second word left by 8k bits, where k is positive integer.

16. The method as claimed in claim 9, wherein the second rotating step rotates the data right by 8k bits, where k is positive integer.

17. A processor-based automatic alignment method for data movement, wherein unaligned data is stored in a memory at a first position and written to the memory at a second position, the memory has a plurality of m (positive integer)-bit words partitioned by word boundaries, and the unaligned data stored in the memory at the first position is partitioned by word boundaries as a first part, a second part and a third part, the method comprising steps of:
- a fetch start step, which executes a first instruction to fetch a first word from the memory having the first part;
- a fetch end step, which executes a third instruction to fetch a second word from the memory having the second part;
- a first shifting step, which combines the first word and the second word and shifts the combined to a first load position to form a first load combination data;
- a first rotating step, which rotates the first load combination data to a first store position in accordance with written unaligned address, thereby generating a first rotated data;
- a first mask writing step, which masks the first rotated data in accordance with written unaligned address and writes it to the memory; and
- a second mask writing step masks unwritten part of the first rotated data and writes it to the memory.

18. The method as claimed in claim 17, wherein the first shifting step applies a shift operation to the combined first word and second word.

19. The method as claimed in claim 17, wherein the first shifting step applies a rotation operation to the combined first word and second word.

20. The method as claimed in claim 17, wherein the first part and the third part have a size less than m bits respectively.

21. The method as claimed in claim 17, wherein the first part has a size equal to m bits.

22. The method as claimed in claim 17, wherein m is 32.

23. The method as claimed in claim 17, wherein the first shifting step shifts the combined first word and second word left by 8k bits, where k is positive integer.

24. The method as claimed in claim 17, wherein the second rotating step rotates the data right by 8k bits, where k is positive integer.

* * * * *